United States Patent
Hsu et al.

(10) Patent No.: US 6,798,088 B2
(45) Date of Patent: Sep. 28, 2004

(54) STRUCTURE FOR SYMMETRICALLY DISPOSED LINEAR MOTOR OPERATED TOOL MACHINE

(75) Inventors: Chin-Mou Hsu, Taichung (TW); Hsuan-Jen Kung, Douliou (TW); En-Sheng Chang, Taichung (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 33 days.

(21) Appl. No.: 10/289,362

(22) Filed: Nov. 7, 2002

(65) Prior Publication Data

US 2004/0090126 A1 May 13, 2004

(51) Int. Cl.$^7$ ................................................. B23C 3/00
(52) U.S. Cl. ........................... 310/12; 310/13; 409/202; 409/235; 409/212; 409/190; 409/191
(58) Field of Search ........................... 310/12; 409/202, 409/235, 234, 212, 237, 190, 191; 408/234

(56) References Cited

U.S. PATENT DOCUMENTS

| | | | | |
|---|---|---|---|---|
| 4,985,651 A | * | 1/1991 | Chitayat | 310/12 |
| 5,933,933 A | * | 8/1999 | Fritz | 29/33 |
| 6,068,431 A | * | 5/2000 | Line | 409/202 |
| 6,540,459 B2 | * | 4/2003 | Hofman | 409/237 |

* cited by examiner

*Primary Examiner*—Thomas M. Dougherty
*Assistant Examiner*—Iraj A. Mohandesi
(74) *Attorney, Agent, or Firm*—Rabin & Berdo, P.C.

(57) ABSTRACT

The structure for symmetrically disposed linear motor operated tool machine comprises two parallelly erected sustaining walls, a movable gantry, a sliding saddle, a tool spindle, and a weight compensation device. At both sides of the movable gantry between the sustaining walls, between the gantry and the sliding saddle, and between the tool spindle and the sliding saddle, a pair of linear motors is symmetrically disposed such that the armature reaction between the winding and magnet is compensated each other by the opposite one therefore any possible deformation force to the tool machine structure is eliminated.

13 Claims, 3 Drawing Sheets

STRUCTURE FOR SYMMETRICALLY DISPOSED LINEAR MOTOR OPERATED TOOL MACHINE

BACKGROUND OF THE INVENTION

1. Field of the Invention

The present invention relates to a structure for a symmetrically disposed linear motor operated tool machine, in particular, to the structure of a tool machine which is driven by symmetrically disposed high output linear motors that allow the machine to evade structural deformation.

2. Description of the Prior Art

The basic structural strength and working precision for conventional tool machines can be achieved by precise control of the servo motors and ball screws which are used as a driving source.

The need for high working speed and output of tool machines has become greater and greater in order to keep pace with the development of the high speed machine technology which weeds out the conventional tool machines operated by servo motors and ball screw units. Now the linear motor driving system appears on the stage to solve this problem timely. The strong driving force generated by high intensity electric and magnetic fields of the windings and the permanent magnets operate the tool machines precisely with high speed but with very little contact frictional resistance loss.

In the meanwhile, those C type or inverse U type frame structures that have been used satisfactorily for a long time along with the conventional tool machines operated by servo motors or ball screw units now encounter a doubtful problem as to if it possible for these structures to serve for the modern high speed and high output tool machines which are driven by the linear motors that might exert strong deformational even destructive force produced by armature reaction between the winding current and the magnetic field to the machine structures.

US 2002/0047319 and EP1186374 disclose tool machines using the linear motors for driving. But, similar to other conventional techniques, the tool machines according to these two cited publications are unable to eliminate the aforementioned shortcomings due to asymmetrical disposal of the linear motors. Besides, in addition to low efficiency and speed caused by insufficient driving force, the backlash and sags among transmission components such as screws and gears, results in a failure to maintain the necessary working precision of the tool machines.

It is what the reason the inventor of the present invention has endeavored for years by continuous research and experimentation trying to find out the remedy to rectify the inherent shortcomings common to the conventional techniques described above, and finally has come to realization of the present invention.

SUMMARY OF THE INVENTION

It is an object of the present invention to provide a structure for symmetrically disposed linear motor operated tool machine which is capable of generating several times of driving force than a conventional one to improve the working efficiency of a tool machine.

It is another object of the present invention to provide a structure for symmetrically disposed linear motor operated tool machine which is capable of operating with many times of working accuracy than a conventional machine employing servo motors or ball screw units by using small inertia, backlashless and frictionless linear motors.

It is still another object of the present invention to provide a structure for symmetrically disposed linear motor operated tool machine whose slide rails are free from overload and the machine structure is never deformed by symmetrically disposing the linear motors so as to compensate the armature reactional force coming from individual motors.

It is one more object of the present invention to provide a structure for symmetrically disposed linear motor operated tool machine which is supported by two parallelly standing walls at two sides to intensify the structural strength.

To achieve these and other objects mentioned above, the structure of the present invention comprises two parallelly standing sustaining walls, a movable gantry, a sliding saddle, a tool spindle, and a weight compensation device. Wherein, at both sides of the movable gantry between the sustaining walls, between the sliding saddle and the movable gantry, and between the tool spindle and the sliding saddle, pairs of linear motors are symmetrically disposed such that the armature reaction arising between windings and magnets of linear motors is compensated each other by the opposite one therefore eliminating any extra exerting force to deform or destroy the structure or causing overload to the slide rails. The parrallelly standing sustaining walls also contribute to symmetry of the entire structure and serve to intensify the structural strength.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 1:
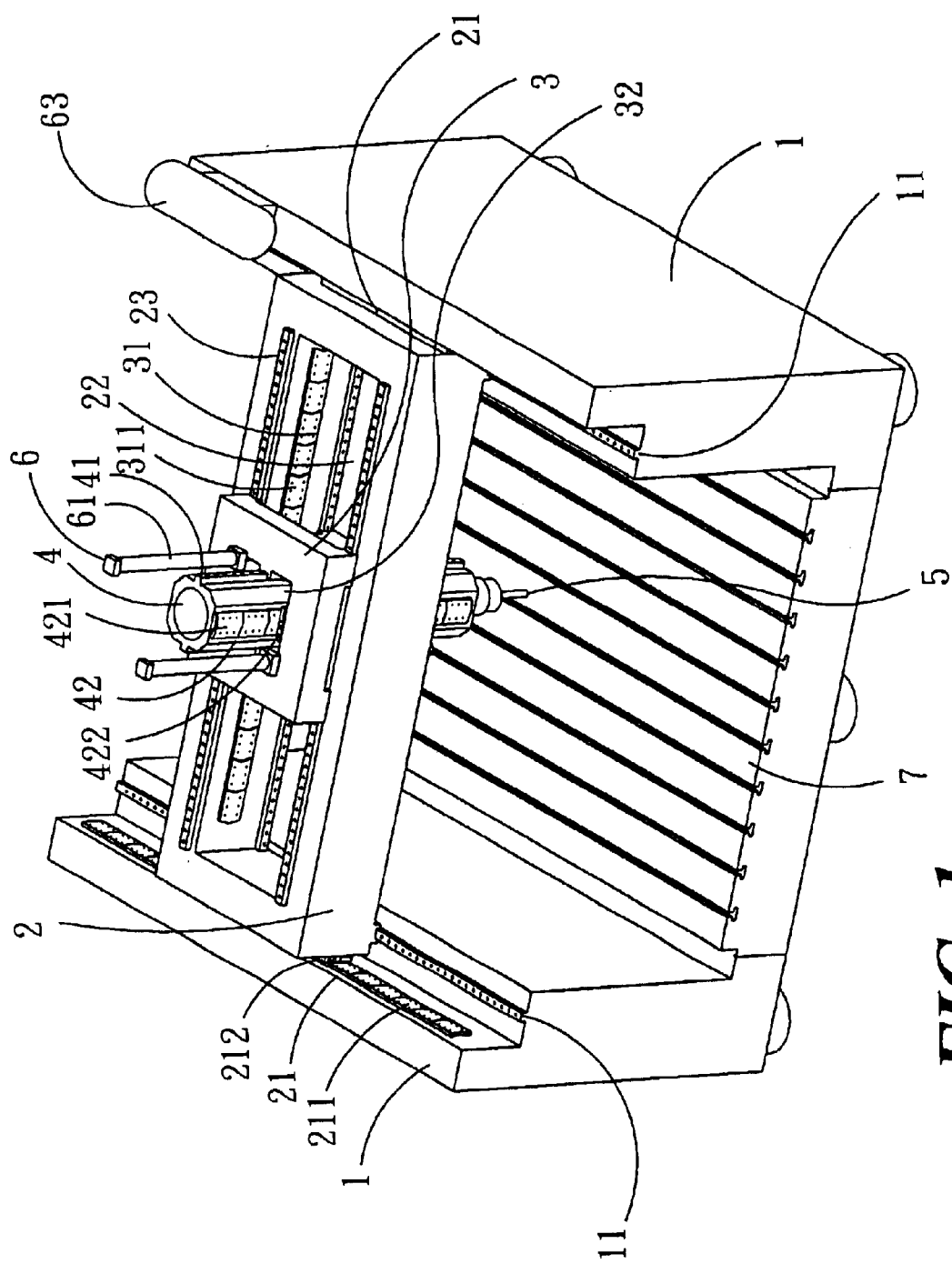
FIG. 1 is a three dimensional view of the structure for the tool machine according to the present invention.
Figure 2:
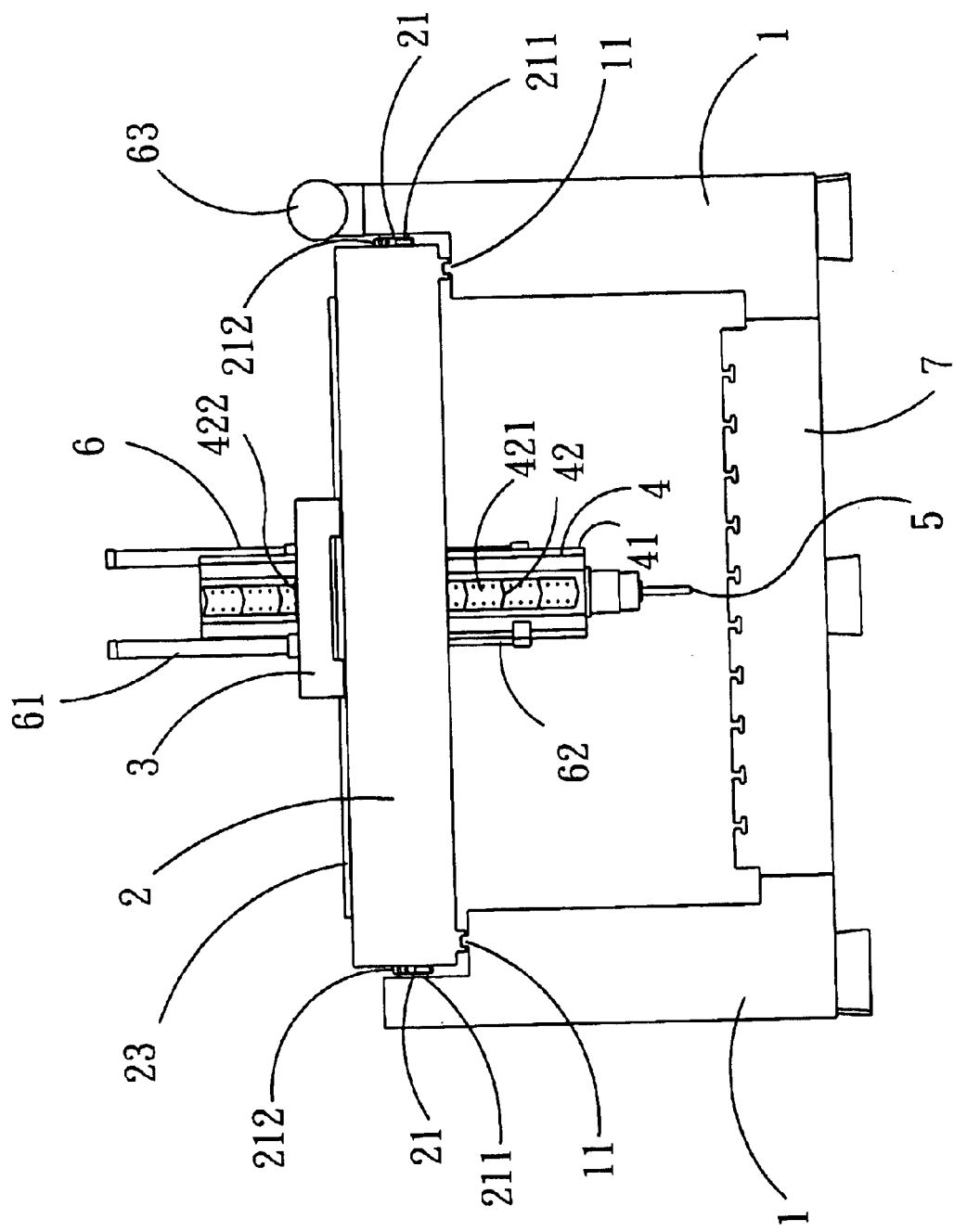
FIG. 2 is a front view of the structure for the tool machine according to the present invention.
Figure 3:
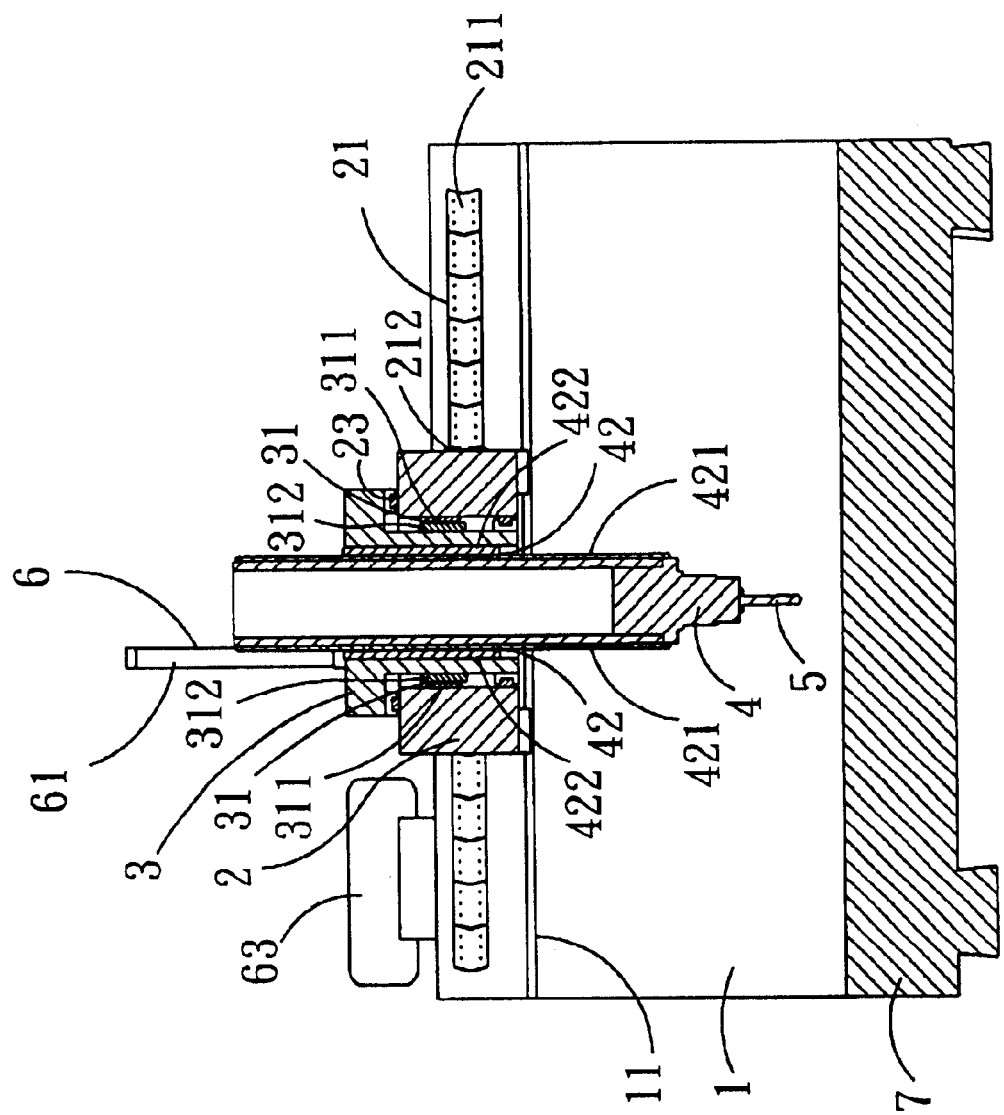
FIG. 3 is a cross sectional view of the present invention.

Referring simultaneously to FIG. 1 through FIG. 3 which show a three dimensional view, a front view, and a cross sectional view of the present invention. The structure for the tool machine of the present invention comprises two parallelly standing sustaining walls 1 erected at two sides of the tool machine, a movable gantry 2, a sliding saddle 3, a tool spindle 4, a cutter tool 5, a weight compensation device 6, and a pallet 7.

The two sustaining walls 1 erected at both sides of the tool machine entrain the movable, box-shaped gantry 2 transversely on top of them. The term "box-shaped" means that the gantry has an essentially rectangular, parallelepiped configuration. The gantry 2 can reciprocate along slide rails 11 laid on the sustaining walls 1.

Two linear motors 21 symmetrically disposed on both sides of the movable gantry 2 each includes a permanent magnet 211 set on the sustaining wall 1 and a winding 212 equipped on the gantry 2 to provide the gantry 2 with a driving force. It should be noted that a strong armature reaction built up between the permanent magnet 211 and winding 212 might cause the tool machine to severely deform, or even to be destroyed, unless the linear motors 21 are symmetrically disposed at both sides of the gantry 2 so as to compensate the armature reaction therebetween.

A slot 22 is formed in the movable gantry 2 and has a the sliding saddle 3 transversely reciprocative on the gantry 2 along slide rails 23 laid on both sides of slot 22. By doing so the sliding saddle 3 is supported reliably at two sides to assure the structural stability.

Two driving linear motors 31 are provided between the sliding saddle 3 and the gantry 2. The two linear motors 31 are symmetrically disposed to balance the magnetic force exerted on two sides of the sliding saddle 3. The permanent magnets 311 of the linear motors 31 are set on the gantry 2, while the windings 312 of the linear motors 31 are equipped on the sliding saddle 3.

The sliding saddle 3 has a via hole 32 passing through its center thereof. The tool spindle 4 is movable up and down in the via hole 32 with its slide rails 41 driven by two linear motors 42 disposed symmetrically between the tool spindle 4 and the sliding saddle 3 so as to balance the magnetic force exerted on two sides of the tool spindle 4. The permanent magnets 421 of the linear motor 42 are set on the tool spindle 4 while the windings 422 of the linear motors 42 are equipped on the sliding saddle 3.

The tool spindle 4 holds the cutter 5 to cut a working piece. The weight compensation device 6 is affixed to the sliding saddle 3 for balancing the instinct weight of the tool spindle 4 so as to reduce the load of the linear motor 42. The weight compensation device 6 is formed of several pressurized pneumatic cylinders 61 which are jointed to the tool spindle 4 with mandrels 62 so as to keep the tool spindle 4 in a balanced state. The cylinders 61 are connected with one or more than one compressed air accumulator 63 for producing a stable push or thrust force. The working pallet 7 is provided between the two sustaining walls 2 such that the cutting work can be conveniently carried out.

It emerges from the description of the above example that the invention has several noteworthy advantages in particular:

1. The driving force of the linear motors of the present invention is several times as much compared with that of any conventional ones.

2. As the inertia of the linear motors of the present invention is very small, friction loss may be kept as small as possible so as to greatly improve the working precision and speed.

3. Symmetrically disposed linear motors provide a compensation effect for the armature reaction force exerted on the machine frame, and minimizes the load on the slide rails to prevent the machine structure from deformation or yielding.

4. The machine structure sustained by two parrallelly standing walls at both sides intensifies the structural strength greater compared with the conventional C type or inverse U type one.

Many changes and modifications in the above described embodiment of the invention can, of course be carried out without departing from the scope thereof. Accordingly to promote the progress in science and the useful arts, the invention is disclosed and is intended to be limited only by the scope of the appended claims.

What is claimed is:

1. Structure for symmetrically disposed linear motor operated tool machine comprising:

two sustaining walls parallelly erected at two side of the tool machine, and a slide rail being laid on top of each sustaining wall;

a movable, box-shaped gantry having an essentially rectangular, parallelepiped outer configuration, and being transversely set on said slide rails which are laid on top of said sustaining walls and being capable of reciprocating in the longitudinal direction along said slide rails, a slot being formed in said movable gantry with slide rails laid on both sides of slots, and two linear motors being symmetrically disposed at both sides between said gantry and said sustaining walls;

a sliding saddle set in said slot of said gantry and being transversely reciprocative on said gantry along slide rails laid on both sides of said slot, two linear motors being symmetrically disposed at both sides between said sliding saddle and said gantry;

a tool spindle set in said sliding saddle, being movable up and down therein with slide rails provided on both sides thereof, two linear motors being provided at both sides between said tool spindle and said sliding saddle;

a weight compensation device formed of at least one pressurized pneumatic cylinder being affixed to said sliding saddle; and a working pallet being fixed stationary between said two sustaining walls, said working pallet and said two sustaining walls collectively forming a U-shape, with said tool spindle having a portion that projects below said gantry and which is movable up and down in the U-shape.

2. The structure for tool machine of claim 1, wherein said linear motors disposed between said sustaining walls and said gantry are composed of permanent magnets set on said sustaining walls and windings equipped on said gantry.

3. The structure for tool machine of claim 1, wherein said linear motors disposed between said gantry and said sliding saddle are composed of permanent magnets set on said gantry and windings equipped on said sliding saddle.

4. The structure for tool machine of claim 1, wherein said linear motors disposed between said tool spindle and said sliding saddle are composed of permanent magnets set on said tool spindle and windings equipped on said sliding saddle.

5. The structure for tool machine of claim 1, wherein said pressurized pneumatic cylinders are jointed to said tool spindle with mandrels, said pressurized pneumatic cylinders are connected to one or more than one compressed air accumulator for producing a stable push or thrust force.

6. A symmetrically disposed, linear motor operated tool machine, comprising:

two parallel, spaced-apart sustaining walls, each wall having a longitudinally-extending slide rail disposed on a top thereof;

a box-shaped movable gantry having an essentially rectangular, parallelepiped outer configuration, and extending between said walls and being disposed on said slide rails, and being adapted to reciprocate in a longitudinal direction along said slide rails, said gantry having a central, transversely-extending slot formed therein which extends in a direction perpendicular to the longitudinally-extending slide rails, the slot defining two sides, said gantry having transversely-extending slide rails disposed on each respective side of the slot;

a sliding saddle disposed in the slot of said gantry and being adapted to reciprocate in a transverse direction in the slot and along the transversely-extending slide rails, said sliding saddle having a through hole in a center thereof;

a tool spindle disposed in the through hole of said sliding saddle, said tool spindle having vertically-extending slide rails disposed on sides thereof, said tool spindle being adapted to move up and down within the through hole and the slot using the vertically-extending slide rails, said tool spindle having a portion that projects below said gantry and which is movable up and down in a space disposed below said gantry and between said sustaining walls;

a first and second, symmetrically-disposed linear motor, said first linear motor being disposed between said gantry and one of said sustaining walls, and said second linear motor being disposed between said gantry and another one of said sustaining walls;

a third and fourth, symmetrically-disposed linear motor, said third linear motor being disposed on one side of the slot and between said gantry and said sliding saddle, said fourth linear motor being disposed on another side of the slot and between said gantry and said sliding saddle; and at least a fifth and a sixth linear motor disposed between said tool spindle and said sliding saddle.

7. The tool machine recited in claim 6, further comprising:

a weight compensation device formed of at least one pressurized pneumatic cylinder affixed to said sliding saddle.

8. A symmetrically disposed, linear motor operated tool machine, comprising:

two parallel, spaced-apart sustaining walls, each wall having a longitudinally-extending slide rail disposed on a top thereof;

a movable gantry extending between said walls and being disposed on said slide rails, and being adapted to reciprocate in a longitudinal direction along said slide rails, said gantry having a central, transversely-extending slot formed therein which extends in a direction perpendicular to the longitudinally-extending slide rails, the slot defining two sides, said gantry having transversely-extending slide rails disposed on each respective side of the slot;

a sliding saddle disposed in the slot of said gantry and being adapted to reciprocate in a transverse direction in the slot and along the transversely-extending slide rails, said sliding saddle having a through hole in a center thereof;

a tool spindle disposed in the through hole of said sliding saddle, said tool spindle having vertically-extending slide rails disposed on sides thereof, said tool spindle being adapted to move up and down within the through hole and the slot using the vertically-extending slide rails;

a first and second, symmetrically-disposed linear motor, said first linear motor being disposed between said gantry and one of said sustaining walls, and said second linear motor being disposed between said gantry and another one of said sustaining walls;

a third and fourth, symmetrically-disposed linear motor, said third linear motor being disposed on one side of the slot and between said gantry and said sliding saddle, said fourth linear motor being disposed on another side of the slot and between said gantry and said sliding saddle;

at least a fifth and a sixth linear motor disposed between said tool spindle and said sliding saddle; and a weight compensation device formed of at least one pressurized pneumatic cylinder affixed to said sliding saddle, wherein said pressurized pneumatic cylinder is jointed to said tool spindle with mandrels, said pressurized pneumatic cylinder being connected to at least one compressed air accumulator for producing a stable push or thrust force.

9. The tool machine recited in claim 6, further comprising:

a stationary working pallet fixed between said two sustaining walls.

10. The tool machine recited in claim 6, further comprising:

a weight compensation device formed of at least one pressurized pneumatic cylinder affixed to said sliding saddle; and a stationary working pallet fixed between said two sustaining walls.

11. The tool machine recited in claim 6, wherein said first and second linear motors each include windings disposed on said gantry, and permanent magnets disposed on said sustaining walls.

12. The tool machine recited in claim 11, wherein said third and fourth linear motors each include permanent magnets disposed on said gantry, and windings disposed on said saddle.

13. The tool machine recited in claim 12, wherein said fifth and sixth linear motors each include permanent magnets disposed on said tool spindle, and windings disposed on said saddle.

* * * * *